(12) United States Patent
Huff et al.

(10) Patent No.: US 6,606,784 B1
(45) Date of Patent: Aug. 19, 2003

(54) PALLET SYSTEM

(75) Inventors: Brad Huff, West Bloomfield, MI (US); Joseph L. La Pres, Brighton, MI (US); James Wayne Lowe, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 09/804,787

(22) Filed: Mar. 13, 2001

(51) Int. Cl.[7] .......... B23P 21/00; B23P 19/00; G06F 7/00

(52) U.S. Cl. ............ 29/709; 29/703; 29/707; 29/784; 29/787; 29/824; 700/217

(58) Field of Search ............. 29/771, 824, 700, 29/703, 702, 707, 709, 784, 787, 822, 823; 700/217, 213, 229

(56) References Cited

U.S. PATENT DOCUMENTS 4,442,335 A * 4/1984 Rossi .......................... 219/79

FOREIGN PATENT DOCUMENTS

JP          406099382       * 4/1994

* cited by examiner

Primary Examiner—John C. Hong
(74) Attorney, Agent, or Firm—Raymond L. Coppiellie

(57) ABSTRACT

A pallet system 10 for use in a manufacturing process. The pallet system includes several pallets 14 which are adapted to receive and support a portion of a product, such as a vehicle underbody 12. The system 10 uses simplified pallets 14 having externally actuated clamping assemblies 62, 64, 66, and 68. A docking station 16 receives the pallets 14 and includes a pair of robots 24, 26 which detect the proper positioning of the underbody 12 upon the pallet 14 and externally activate the clamping assemblies 62, 64, 66, and 68 thereby securing the underbody 12 to the pallet 14. A controller 82 is communicatively connected to the robots 24, 26 and activates a conveyor assembly 20 which transports the pallet 14 to manufacturing stations 21 once the underbody 12 is properly secured to the pallet 14.

12 Claims, 2 Drawing Sheets

PALLET SYSTEM

FIELD OF THE INVENTION

This invention generally relates to a pallet system and more particularly, to a pallet system for use in a manufacturing process and which allows products and components to be relatively easily, securely and removably fixed to pallets and which allows the cost and complexity of the pallets to be desirably reduced.

BACKGROUND OF THE INVENTION

During the manufacture of products, such as automotive vehicles, portions of the vehicles, such as the vehicle underbodies or frames, are often attached to a fixture or pallet which is used to transfer the structures to various manufacturing stations or terminals. At each station or terminal, the vehicle portion or underbody is typically processed and other components and/or portions of the vehicle are assembled and/or "added onto" the underbody according to a particular manufacturing process, method and/or system.

This type of manufacturing process begins by attaching the vehicle underbody or frame to a pallet at a docking station. Each pallet typically includes several automated clamps and an electrical and pneumatic service system which interconnects and communicates with each of the clamps and which selectively actuates the clamps and ensures that the clamps are properly closed and secured to the vehicle underbody before the pallet is transported to the other manufacturing stations. This service system includes a network of pneumatic hoses and/or conduits, various electrical wires and sensors. A service module is attached to each pallet and is communicatively coupled to the various hoses and electrical wires of the service system. A docking module is located at the docking station and is connected to the service module on the pallet and provides pressurized air or gas and electricity to the pallet.

While this type of pallet system is effective to secure a vehicle body to a pallet, it requires the use of relatively complex and costly pallets. Because a relatively large number of pallets are required in a typical manufacturing process, the cost of the manufacturing process is substantially and undesirably increased.

There is therefore a need for a pallet system for use in combination with the manufacture of products such as automotive vehicles, which reduces cost by utilizing simplified pallets.

SUMMARY OF THE INVENTION

A first non-limiting advantage of the invention is that it provides a pallet system for use with an automotive manufacturing process which reduces cost by utilizing simplified pallets that do not require a complex pneumatic and/or electrical service system.

A second non-limiting advantage of the invention is that it provides a simplified pallet having several externally actuatable clamps which are activated by robots and which are effective to securely and removably attach a vehicle underbody to the pallet.

According to a first aspect of the present invention, a pallet system is provided and includes at least one pallet having a plurality of clamping assemblies and a plurality of support members which are adapted to receive and support a product; a docking station which receives the at least one pallet; and at least one robot which is disposed within the docking station and which is effective to selectively engage and actuate each of the plurality of clamping assemblies, thereby securing the product to the at least one pallet.

According to a second aspect of the present invention, a method is provided for securing a portion of a vehicle to a pallet within a manufacturing station. The method includes the steps of providing a pallet for supporting the portion of the vehicle and having a plurality of externally actuatable clamping assemblies; disposing at least one robot within the manufacturing station; transporting the pallet to the manufacturing station; placing the portion of the vehicle upon the pallet; detecting whether the vehicle is properly positioned upon the pallet; and individually activating each of the plurality of externally actuatable clamping assemblies by use of the at least one robot if the portion of the vehicle is properly positioned upon the pallet, thereby securing the portion of the vehicle to the pallet.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
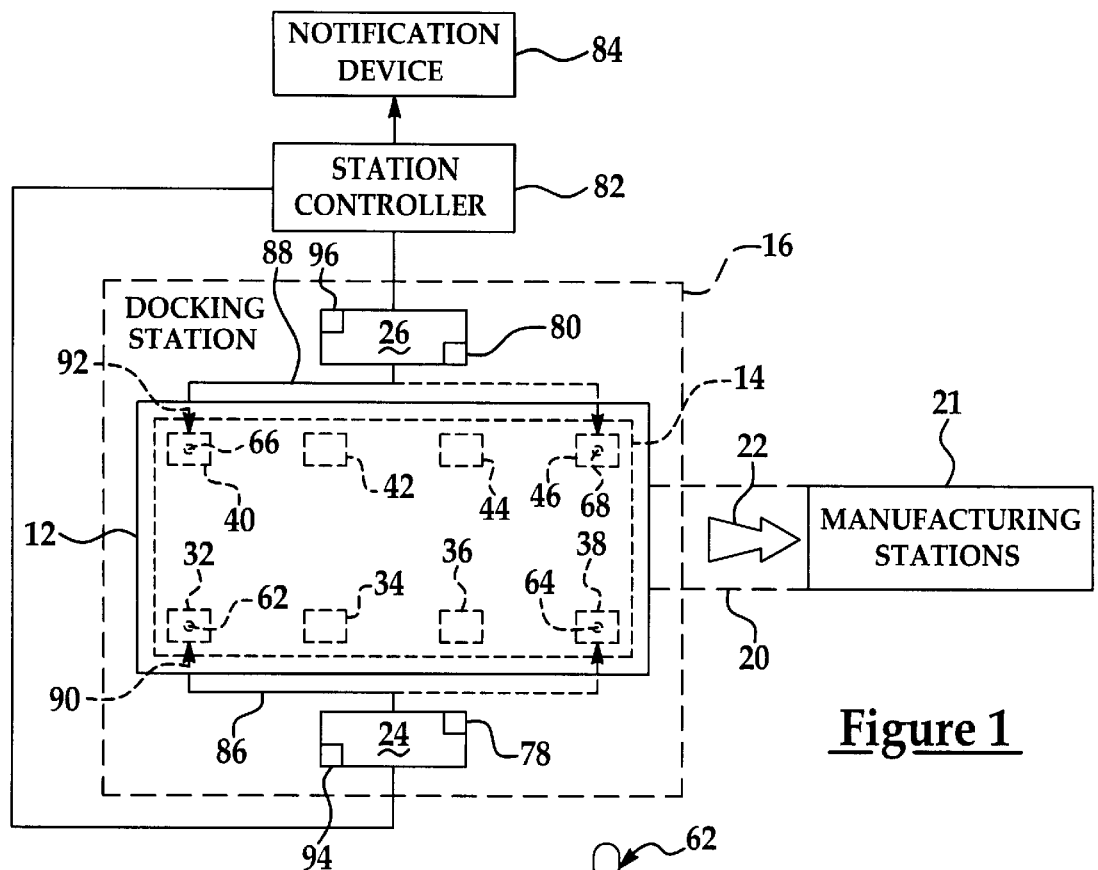
FIG. 1 is a schematic diagram illustrating a pallet system which is made in accordance with the teachings of the preferred embodiment of the invention.

Referring now to FIG. 1, there is shown a pallet system 10 which is made in accordance with the teachings of the preferred embodiment of the invention. In the preferred embodiment, system 10 is used in a manufacturing process and more particularly, is used to removably secure automobile structures, portions or products 12 to various pallets 14 in order to transport the automobile portions 12 to various manufacturing stations 21. In the preferred embodiment of the invention, the portions or structures 12 that are attached to the pallets 14 are vehicle bodies, underbodies and/or other vehicle components. In alternate embodiments, structures 12 may comprise other types of manufactured products.

System 10 includes a docking station 16 having a conventional conveyor assembly 20 which is used to transport or "shuttle" each pallet 14 in the direction of arrow 22 to the various manufacturing stations 21. In the preferred embodiment, the conveyor assembly 20 comprises a conventional conveyor belt and/or roller assembly. Each pallet 14 is transferred to the docking station 16 by use of the conveyor assembly 20. Once the pallet 14 is in place in the docking station 16, the vehicle underbody or structure 12 is received and situated upon the pallet 14. In the preferred embodiment, the placement of the underbody 12 upon the pallet 14 is performed by use of a conventional mechanical transport mechanism (e.g., a forklift) or a robotic crane, hoist or apparatus (not shown). In alternate embodiments, underbody or structure 12 may be manually situated upon the pallet 14.

Figure 3:
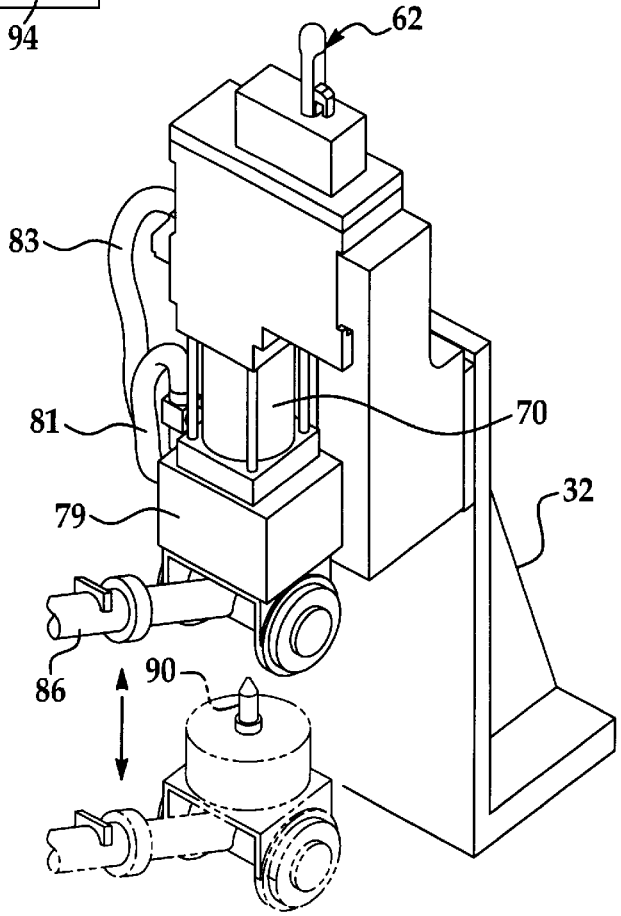
FIG. 3 is a perspective view of a support member and clamping assembly which forms a portion of the pallet shown in FIG. 2.
Figure 2:
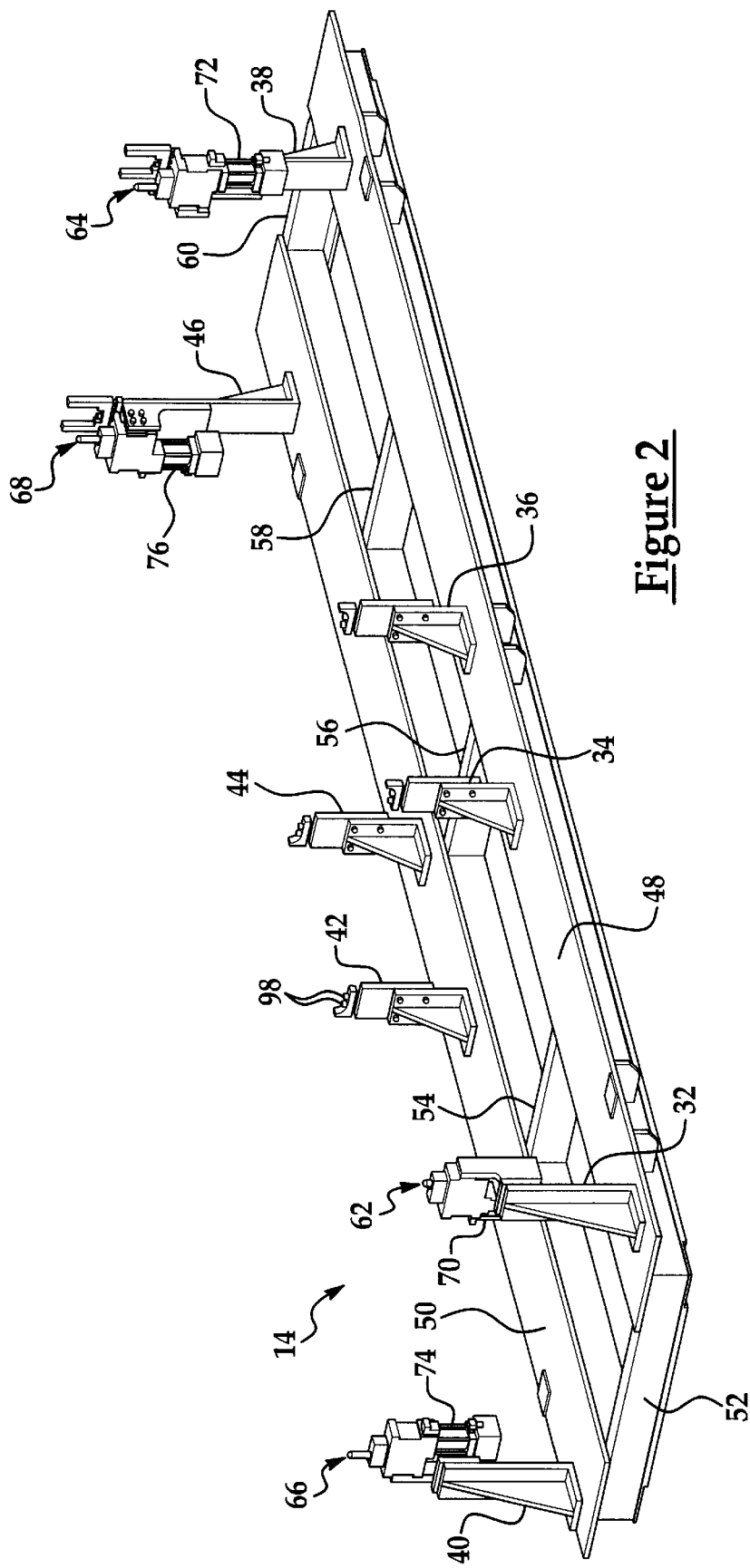
FIG. 2 is a perspective view of a pallet which is made in accordance with the teachings of the preferred embodiment of the invention and which is adapted for use within the pallet system shown in FIG. 1.

Referring now to FIG. 2, in the preferred embodiment of the invention, each pallet 14 is manufactured from relatively strong and durable material (e.g., steel). Each pallet 14 includes a pair of generally elongated base members 48, 50 which are fixedly coupled together by cross members 52, 54, 56, 58, and 60. Each pallet 14 further includes several "risers" or support members 32–46 upon which the vehicle underbody 12 rests. In the preferred embodiment, pallet 14 includes four outer support members 32, 38, 40, and 46 which are located at the outer corners of the pallet 14, and four inner support members 34, 36, 42 and 44. Each member 32, 34, 36, and 38 is fixedly coupled to base member 48 in a conventional manner (e.g., welded or by use of conventional fasteners) and each member 40, 42, 44, and 46 is fixedly coupled to base member 50 in a conventional manner (e.g., welded or by use of conventional fasteners). Each support member 32–46 may include pin members 98 which dimensionally align with and receive holes within underbody 12 (not shown), thereby allowing the underbody 12 to be properly positioned upon pallet 14. Each of the corner support members 32, 38, 40 and 46 respectively includes a clamp assembly 62, 64, 66, 68 which is coupled to and which is respectively actuated by use of a conventional pneumatic cylinder 70, 72, 74 and 76. Each pneumatic cylinder includes a substantially identical, conventional pneumatic valve assembly 79 which allows air or gas to be transferred in and out of the cylinders 70–76 (e.g., by use of pneumatic hoses or conduits 81, 83, as shown in FIG. 3), thereby allowing the clamps 62–68 to be selectively activated and deactivated (e.g., clamped and unclamped).

In the preferred embodiment, docking station 16 includes two automated robots 24, 26 which are located on opposing sides of the docking station 16 and which are each positioned to be aligned with a unique side of the pallet 14 when the pallet 14 is transferred to the docking station 16. Robots 24, 26 are conventional industrial "stand-alone" servorobots. Each robot 24, 26 respectively includes a conventional camera, optical sensor or other suitable sensor 78, 80 which senses and/or measures the spatial relationship between the vehicle underbody 12 and the pallet 14. Each sensor 78, 80 determines whether the underbody 12 is properly positioned upon the pallet 14 prior to activating any of clamps 62–68. Particularly, each sensor 78, 80 detects whether the each of the support members 32–46 are properly aligned with and/or engaged with corresponding portions of the vehicle underbody 12. For example and without limitation, in one non-limiting embodiment, sensors 78, 80 are adapted to detect gaps between portions of the pallet 14 and the underbody 12 which would exist if the underbody 12 was not properly situated upon pallet 14. In the preferred embodiment, the robots 24, 26 are each communicatively coupled to a docking station controller and/or processor 82. If either robot 24, 26 senses that the underbody 12 is not properly positioned upon the pallet 14 (e.g., by use of sensors 78, 80), the sensing robot will communicate a signal to the controller 82 which will, in turn, communicate a signal to the robots 24, 26, effective to cause the robots 24, 26 to refrain from activating any of clamping assemblies 62–68. In the preferred embodiment, controller 82 is communicatively coupled to a conventional audio and/or visual notification device 84 (e.g., an audio speaker and/or a light) which alerts an operator that the underbody 12 is not properly positioned upon the pallet 14. In other alternate embodiments, the optical sensors 78, 80 may be replaced with a single camera or optical sensor which determines whether the underbody 12 is properly situated on the pallet 14 and which communicates signals to the controller 82 to indicate whether the underbody 12 is properly positioned upon pallet 14.

Each of the robots 24, 26 further respectively includes a selectively movable and extendable arm assembly 86, 88. Each arm assembly 86, 88 respectively includes an output valve or terminal 90, 92. Each valve or terminal 90, 92 Each valve or terminal 90, 92 is respectively and fluidly coupled to a source of pressurized air 94, 96 which is respectively contained robots 24, 26. Output terminals 90, 92 are adapted to individually and sealably mate with valve assemblies 79, as shown best in FIG. 3.

In operation, pallets 14 are transferred to docking station 16 by use of conveyor assembly 20. Once a pallet 14 has been delivered to station 16, an underbody 12 is placed upon the pallet 14, and sensors 78, 80 scan the pallet 14 and underbody 12 to determine whether the underbody is properly situated upon pallet 14. If the underbody 12 is not properly situated upon pallet 14, any sensor 78, 80 detecting the improper placement generates a signal to controller 82 which activates notification device 84, thereby notifying an operator and allowing the placement to be corrected. If the underbody 12 is properly placed upon the pallet 14, the sensors 78, 80 communicate signals to controller 82 which generates a signal to each of the robots 24, 26, effective to notify the robots 24, 26 of the proper placement and to cause the robots 24, 26 to activate clamps 62–68. Particularly, upon receiving the signals from controller 82, robot 26 extends arm assembly 88 so that the terminal 92 engages valve assembly 79 of cylinder 74. Robot 26 then communicates pressurized air or gas to terminal 92 and through valve assembly 79, thereby activating clamp 66. Once clamp 66 is activated, it secures a portion of underbody 12 to pallet 14. Robot 26 then disengages the valve assembly 79 and extends arm 88 to cylinder 76 and repeats the foregoing procedure, thereby securing a second portion of the underbody 12 to pallet 14 by use of clamp 68. Robot 24 performs the same procedure on the other side of the pallet 14, thereby energizing cylinders 70, 72 and activating clamps 62, 64. As each clamp 62–68 is activated and fully closed, robots 24, 26 communicate signals to station processor and/or controller 82. Controller 82 detects that each clamp 62–68 is activated and once each clamp 62–68 is activated, station controller 82 activates conveyor assembly 20 to transport pallet 14 to the manufacturing stations 21 (e.g., controller 82 communicates a signal to the conveyor assembly 20 or a conveyor assembly controller (not shown), thereby activating the conveyor assembly 20). In this manner, controller 82 prevents the pallet 14 from being transported to the manufacturing stations 21 until robots 24, 26 confirm that the underbody 12 has been properly clamped to the pallet 14.

It should be appreciated that the pallet system 10 may also include an unloading station which is substantially similar to docking station 16 and which includes robots substantially identical to robots 24, 26 which are effective to deactivate clamps 62–68 so that the processed product or underbody 12 may be removed from pallet 14.

In other alternate embodiments, clamps 62–68 may be electrically or mechanically actuated by robots 24, 26, and cylinders 70–76 may be replaced with electrical and/or mechanical actuators. Further, different numbers of robots may be used in alternate embodiments. Moreover, it should be appreciated that the invention is not limited to the form, shape or number of clamps shown in the figures and described above, but that different types and numbers of clamps may be used based upon the desired application.

It should be further appreciated that the foregoing pallet system 10, externally actuated clamping assemblies 62–68 and robots 24, 26 allow the pallets 14 used within the manufacturing process to be made without complex electrical and pneumatic service networks. Particularly, robots 24, 26 externally actuate the clamps 62–68 and verify that the underbodies 12 is properly situated upon the pallets and that the clamps 62–68 are closed, thereby allowing the pallets 14 to be manufactured in a less costly and complex manner without the complex networks present in prior pallets.

It should be understood that Applicants' invention is not limited to the exact system and method which has been described herein, but that various changes and/or modifications may be made without departing from the spirit and/or the scope of Applicants' invention.

What is claimed is:

1. A pallet system comprising:
    at least one pallet having a plurality of pneumatic clamping assemblies and a plurality of support members which are adapted to receive and support a product;
    a docking station which receives said at least one pallet;
    at least one robot which is disposed within said docking station in close proximity to said at least one pallet, said at least one robot includes at least one sensor and at least one selectively movable arm, wherein said at least one robot senses the position of said product upon said at least one pallet and communicates said sensed position; and
    a controller which is communicatively coupled to said at least one robot, wherein said controller receives said communicated sensed position from said at least one robot, effective to determine whether said product is positioned correctly upon said at least one pallet and, upon a determination of a correctly positioned product, said controller communicates a signal to said at least one robot, wherein said at least one robot receives said communicated signal from said controller, effective to activate said at least one arm, wherein said at least one arm selectively engages and actuates each of said plurality of pneumatic clamping assemblies, thereby securing said product to said at least one pallet in a correct position.

2. The pallet system of claim 1 wherein each of said plurality of clamping assemblies includes a pneumatic cylinder.

3. The pallet system of claim 1 wherein said at least one robot actuates said plurality of clamping assemblies only if said sensor detects that said product is properly positioned upon said pallet.

4. The pallet system of claim 3 wherein said sensor comprises an optical sensor.

5. The pallet system of claim 3 wherein said sensor comprises a camera.

6. The pallet system of claim 3 further comprising a conveyor assembly which selectively transports said at least one pallet.

7. The pallet system of claim 6 wherein said product comprises a vehicle underbody.

8. A pallet system for use in a vehicle manufacturing process, said pallet system comprising:
    a pallet which selectively receives and supports a vehicle structure, and which includes a plurality of first and second pneumatic clamping assemblies;
    a docking station which receives said pallet;
    a first robot which is disposed on a first side of said docking station, and which includes a sensor which is effective to detect whether a first portion of said vehicle structure is properly positioned on said pallet and to generate a first signal in response thereto, and being further effective to selectively actuate said plurality of first pneumatic clamping assemblies;
    a second robot which is disposed on a second side of said docking station, and which includes a sensor which is effective to detect whether a second portion of said vehicle structure is properly positioned on said pallet and to generate a second signal in response thereto, and being further effective to selectively actuate said plurality of second pneumatic clamping assemblies; and
    a controller which is communicatively coupled to said first and second robots and which is effective to receive said first and second signals, to determine whether said vehicle structure is properly positioned upon said pallet based upon said received signals, and if said vehicle structure is properly positioned on said pallet, to generate signals to said first and second robots, effective to cause said first and second robots to respectively actuate said plurality of first and second clamping assemblies, thereby securing said vehicle structure to said pallet.

9. The pallet system of claim 8 wherein said vehicle structure comprises an underbody.

10. The pallet system of claim 8 further comprising:
    a notification device which is communicatively coupled to said controller; and
    wherein said controller is further effective to generate a signal to said notification device if said vehicle structure is not properly positioned on said pallet, effective to activate said notification device.

11. The pallet system of claim 10 wherein said notification device comprises a visual notification device.

12. The pallet system of claim 10 wherein said notification device comprises an audible notification device.

\* \* \* \* \*